UNITED STATES PATENT OFFICE.

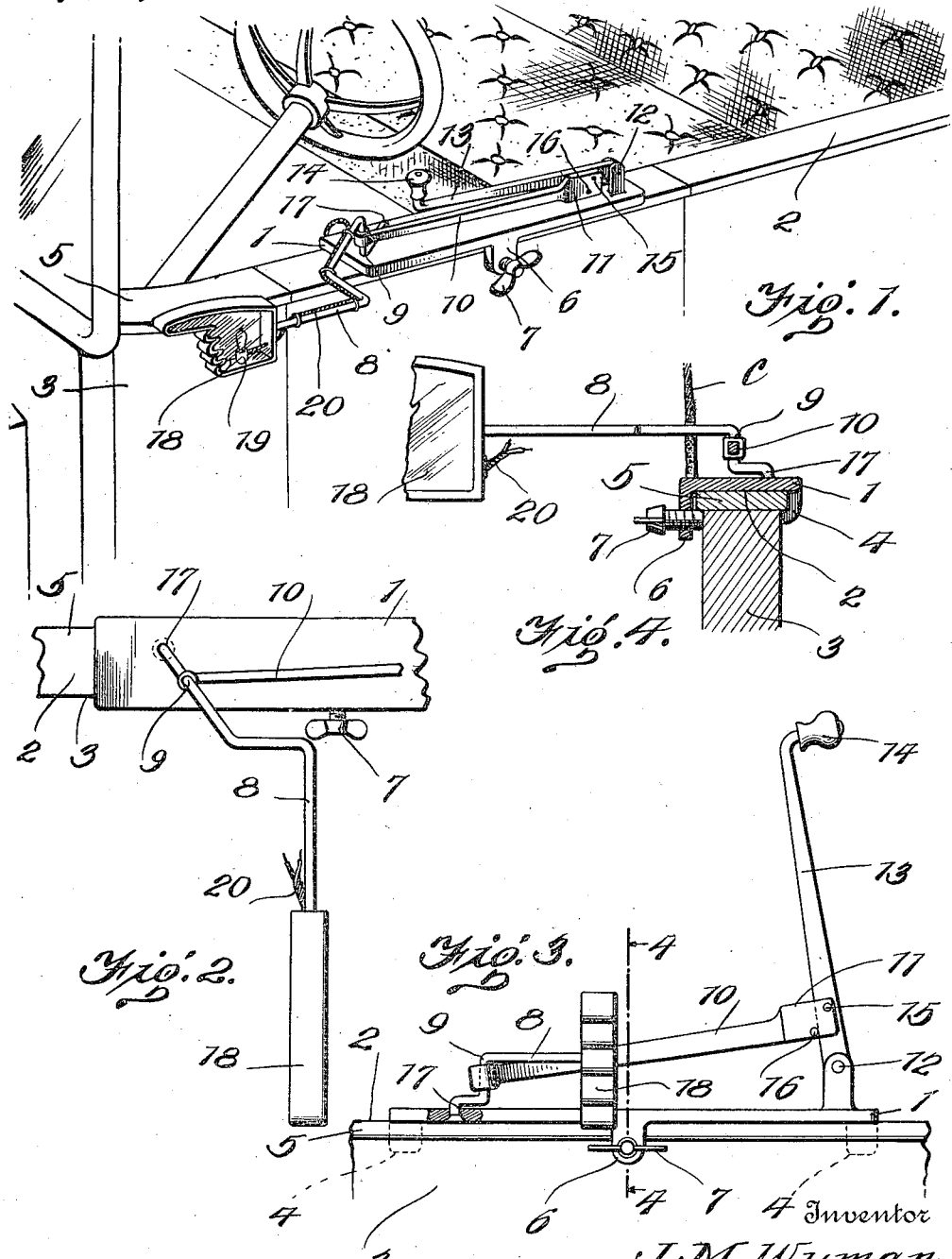

JESSE M. WYMAN, OF CANTON, OHIO.

TURNING-SIGNAL FOR AUTOMOBILES.

1,224,348.　　　　　　Specification of Letters Patent.　　　Patented May 1, 1917.

Application filed March 23, 1916. Serial No. 86,198.

*To all whom it may concern:*

Be it known that I, JESSE M. WYMAN, a citizen of the United States, residing at Canton, in the county of Stark and State of Ohio, have invented certain new and useful Improvements in Turning-Signals for Automobiles; and I do declare the following to be a full, clear, and exact description of the invention, such as will enable others skilled in the art to which it appertains to make and use the same.

My invention is a signal to be applied to an automobile and to be operated at the will of the operator to give warning to pedestrians and to the drivers of other vehicles to the effect that the machine equipped with the invention will check its speed or will turn in one direction or the other.

The object of the invention is to provide an extremely simple yet highly efficient device of the class specified which may be readily attached to a number of makes of automobiles and which will operate to advantage even though the storm curtains of the vehicle be lowered.

With this general object in view, the invention resides in certain novel features of construction and in unique combinations of parts to be hereinafter fully described and claimed, the descriptive matter being supplemented by the accompanying drawing which constitutes a part of this application and in which:

Figure 1 is a perspective view of the invention showing its application to a vehicle;

Fig. 2 is a partial top plan view with the indicating hand swung outwardly;

Fig. 3 is a side elevation partly in longitudinal section with the parts positioned as shown in Fig. 2;

Fig. 4 is a transverse section taken on the plane indicated by the line 4—4 of Fig. 3.

In specifically describing the construction shown in the drawing above briefly described, similar characters will be placed on corresponding parts throughout the several views, and reference will be herein made to the numerous elements by their respective indices. To this end, the numeral 1 designates a flat horizontally elongated base plate adapted to rest on the upper edge 2 of one side 3 of an automobile body, preferably on the upper edge of one of the front doors as shown. A pair of curved fingers 4 depend from one edge of the plate to take over the inner edge of the usual finishing strip 5 along the upper edge of the door, while extending downwardly from the opposite edge of said plate is a single finger 6 through which a thumb screw 7 is threaded, said screw being adapted to have its inner end disposed under the opposite edge of said finishing strip as shown most clearly in Fig. 4.

Mounted on the front end of the plate 1 is a laterally swinging arm 8 which is pivoted at its rear end to said plate, said arm being so bent as to position approximately its front half normally parallel with the side of the automobile body and spaced outwardly therefrom so as to clear the side curtains C when the latter are lowered. Near its rear end the arm 8 is bent to form a vertical crank pin 9 which is loosely received in an eye on the front end of an operating link 10 which overlies the plate 1, the rear end of said link being bifurcated at 11.

Pivoted at 12 to the rear end of the plate 1 is an operating lever 13 preferably having an upturned front end provided with an ornamental knob 14, the intermediate portion of said lever being received between the furcations at the rear end of the link 10 and being connected thereto by a pivot pin 15. By this arrangement, an upward and rearward pull on the lever 13 will swing the arm 8 from its normal position longitudinally of the automobile to the position shown in Fig. 2. To limit the lateral swinging of this arm, a second pin 16 passes through the furcations at the rear end of the link 10 immediately below the pin 15, said pin 16 coming in contact with the lever 13 when the latter is raised as shown in Fig. 3.

As clearly shown in the several figures of the drawings, the arm 8 is preferably constructed of a single length of wire bent in the required manner, the rear end of this wire being extended downwardly at 17 through an opening in the plate 1 and upset to provide the pivotal mounting of the arm in question. However, it will be understood that this arm can well be connected with the plate in any other suitable manner. The front end of the arm 8 may carry any preferred type of signal, but this signal is preferably fashioned after a human hand as depicted at 18, the obverse and reverse sides of said signal being formed of colored glass which may be readily seen by daylight and which at night are illuminated by an electric lamp 19 which may receive its current through wires 20 leading from any appropriate source.

By constructing the device in the manner above described, it will be applicable to a number of makes of automobiles and even though the storm curtains thereof be lowered, the signal hand 18 may be thrown outwardly when the operator wishes to give warning that he will check the speed of his machine or will turn in one direction or the other. Furthermore, the device is extremely simple and inexpensive and therefore within reach of practically every automobile owner.

In conclusion, I will state that although certain specific details of construction have been shown and described for accomplishing probably the best results, numerous changes may be made within the scope of the invention as claimed without sacrificing the main advantages thereof.

I claim:—

1. A turning signal for automobiles comprising a horizontally swinging arm to be pivotally mounted on the upper edge of one side of an automobile body, said arm being adapted to normally lie longitudinally of the vehicle and being bent between its ends to form an upright crank pin, and an operating link connected to and extending from said pin.

2. A turning signal for automobiles comprising a horizontally swinging arm to be pivotally mounted on the upper edge of one side of an automobile body, said arm being bent to position its front portion substantially parallel with and spaced outwardly from said edge of the vehicle body, said arm being bent between its ends to form an upright crank pin, and an operating link connected to and extending from said pin.

In testimony whereof I have hereunto set my hand in presence of two subscribing witnesses.

JESSE M. WYMAN.

Witnesses:
ARTHUR U. BORDNER,
HAZEL HAIDET.

Copies of this patent may be obtained for five cents each, by addressing the "Commissioner of Patents, Washington, D. C."